(12) United States Patent
Tsai et al.

(10) Patent No.: US 11,142,299 B2
(45) Date of Patent: Oct. 12, 2021

(54) FLAP INTERCONNECT FOR DEFLECTION CONTROL

(71) Applicant: The Boeing Company, Chicago, IL (US)

(72) Inventors: Kevin R. Tsai, Seattle, WA (US); Kyle A. Johnson, Fall City, WA (US)

(73) Assignee: The Boeing Company, Chicago, IL (US)

(*) Notice: Subject to any disclaimer, the term of this patent is extended or adjusted under 35 U.S.C. 154(b) by 325 days.

(21) Appl. No.: 16/427,584

(22) Filed: May 31, 2019

(65) Prior Publication Data

US 2020/0377194 A1     Dec. 3, 2020

(51) Int. Cl.
| | |
|---|---|
| *B64C 9/02* | (2006.01) |
| *B64C 9/04* | (2006.01) |
| *B64C 9/34* | (2006.01) |
| *B64C 3/18* | (2006.01) |
| *B64C 3/50* | (2006.01) |

(52) U.S. Cl.
CPC ............ *B64C 9/02* (2013.01); *B64C 3/187* (2013.01); *B64C 3/50* (2013.01); *B64C 9/04* (2013.01); *B64C 9/34* (2013.01)

(58) Field of Classification Search
CPC .... B64C 9/20; B64C 3/50; B64C 9/02; B64C 9/04; B64C 9/16; B64D 2045/001
See application file for complete search history.

(56) References Cited

U.S. PATENT DOCUMENTS

| | | | | |
|---|---|---|---|---|
| 4,494,716 A | * | 1/1985 | Breedveld | B64C 9/16 244/213 |
| 4,715,567 A | * | 12/1987 | Poccard | B64C 9/16 244/213 |
| 7,546,984 B2 | * | 6/2009 | Poppe | B64C 9/04 244/131 |
| 8,490,927 B2 | * | 7/2013 | Parker | F16C 23/086 244/215 |
| 10,017,240 B2 | * | 7/2018 | Okabe | B64C 9/16 |

* cited by examiner

*Primary Examiner* — Richard R. Green
*Assistant Examiner* — Madison Elizabeth Dittner
(74) *Attorney, Agent, or Firm* — Felix L. Fischer

(57) ABSTRACT

An aircraft wing has a flap arrangement with an inboard flap configured to move in a chordwise extension direction relative to the wing, the inboard flap having an outboard side, and an outboard flap adjacent to the inboard flap and configured to move in the chordwise extension direction relative to the wing, the outboard flap including an inboard side. A flap interconnect between the inboard flap and outboard flap has a roller mounted to a pin extending from the outboard side of the inboard flap and a guide track extending from the inboard side of the outboard flap. The guide track engages the roller on the inboard flap to limit deflection of the outboard flap relative to the inboard flap during movement of the inboard flap in the chordwise extension direction and movement of the outboard flap in the chordwise extension direction, to provide relative alignment of the inboard flap and outboard flap.

20 Claims, 20 Drawing Sheets

FLAP INTERCONNECT FOR DEFLECTION CONTROL

BACKGROUND INFORMATION

Field

Embodiments of the disclosure relate generally to the field of aircraft flap systems and, more particularly to a flap interconnect employing a roller on a single cam surface interface for deflection control of adjacent flaps.

Background

Aircraft employ flaps to alter area and camber of the wings for enhanced aerodynamic efficiency in take-off, cruise, and landing. Flaps often require deflection control features (such as tracks) to limit the deflections of the flap to acceptable levels, particularly at interfaces between flaps. If the deflection control fittings are removed for weight reduction or other operational reasons, then the deflections of the flaps can become large and the deflections at the interface of adjacent flaps will not be compatible. Additionally, large deflections may create undesirable variance in aerodynamic gaps between the spoilers and flaps. With an interconnect at the interface between adjacent flaps, the support locations of the individual flaps can be positioned to significantly reduce the number of deflection control features required. This is possible because the interconnect allows the main support of the adjacent flap to act as a deflection control feature. Fixed interconnections between the flaps have been employed in the prior art. However, under a skew condition the adjacent flaps will move chordwise relative to one another. A fixed interconnect attached to both flaps may result in one skewed flap forcing unwanted deflection created by the skewed flap to an adjacent flap potentially generating undesirable load or deformation.

SUMMARY

Exemplary embodiments provide an aircraft wing having a flap arrangement with an inboard flap configured to move in a chordwise extension direction relative to the wing, the inboard flap having an outboard side, and an outboard flap adjacent to the inboard flap and configured to move in the chordwise extension direction relative to the wing, the outboard flap including an inboard side. A flap interconnect between the inboard flap and outboard flap has a roller mounted to a pin extending from the outboard side of the inboard flap and a guide track extending from the inboard side of the outboard flap. The guide track engages the roller on the inboard flap to limit deflection of the outboard flap relative to the inboard flap during movement of the inboard flap in the chordwise extension direction and movement of the outboard flap in the chordwise extension direction and at any point in a range of extension, to provide relative alignment of the inboard flap and outboard flap.

In one implementation, a flap interconnect between an inboard flap and an outboard flap has a roller mounted to a pin extending from one of an outboard closeout rib or an inboard closeout rib. A guide track extends from the other one of the outboard closeout rib or the inboard closeout rib. The guide track engages the roller to limit deflection of the outboard flap relative to the inboard flap during movement of the inboard flap in a chordwise extension direction and movement of the outboard flap in the chordwise extension direction, to provide relative alignment of the inboard flap and outboard flap.

The implementations herein provide a method for engagement between an inboard flap and an outboard flap by extending a roller mounted on a pin attached to a first interface between and inboard flap and outboard flap in a flap interconnect and mounting a guide track on a second interface between inboard flap and outboard flap in the flap interconnect. A contact surface on the roller is engaged with a mating surface on the guide track to maintain and relative alignment of the inboard flap and outboard flap.

BRIEF DESCRIPTION OF THE DRAWINGS

The features, functions, and advantages that have been discussed can be achieved independently in various implementations of the present invention or may be combined in yet other implementations further details of which can be seen with reference to the following description and drawings.

DETAILED DESCRIPTION

The implementations described herein provide a flap interconnect engaged between an outboard side of an inboard flap and an inboard side of an outboard flap on an aircraft wing.

Figure 1:
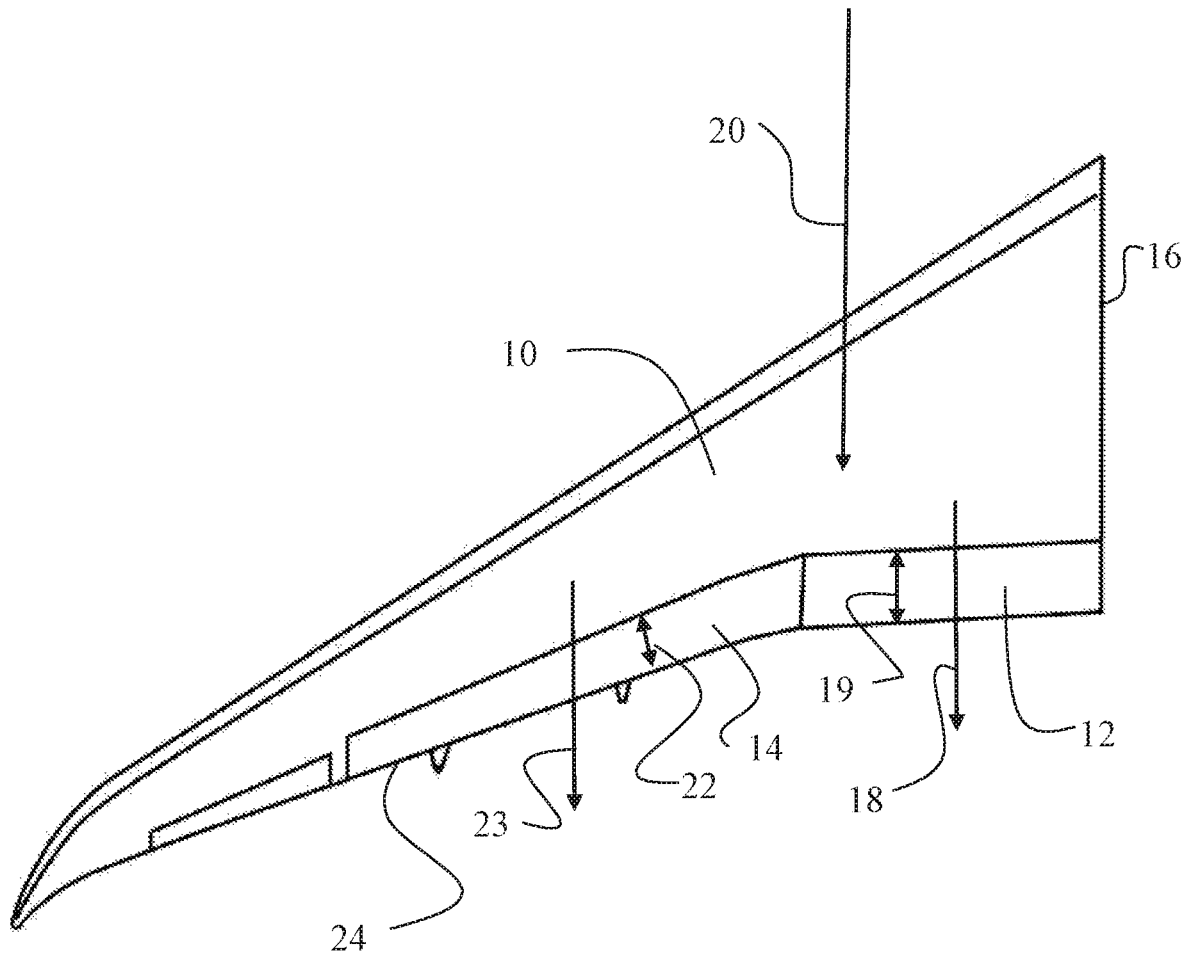
FIG. 1 is a representation of an aircraft wing with which implementations of the flap interconnect provide for deflection control.

Referring to the drawings, FIG. 1 depicts an aircraft wing 10 having a flap arrangement with an inboard flap 12 adjacent to an outboard flap 14. The inboard flap 12 and outboard flap 14 are couplable to the wing 10 to deploy in a chordwise aft direction. The inboard flap 12 is shown in the example implementation in the drawings as proximate a root 16 of the wing and having a chordwise extension direction 18 relative to a chord 19 of the inboard flap 12 which is substantially directly parallel with the free stream airflow 20 while outboard flap 14 has an angle complimentary to the sweep angle of the wing 10 relative to a second chord 22, with respect to the free stream airflow 20 and travels along outboard flap extension direction 23. In alternative implementations, the inboard and outboard flap pair may be located at any location along the trailing edge 24 of the wing 10 and the relative chordwise extension directions 18 and 23 may be angled with respect to one another or may be parallel.

Figure 2:
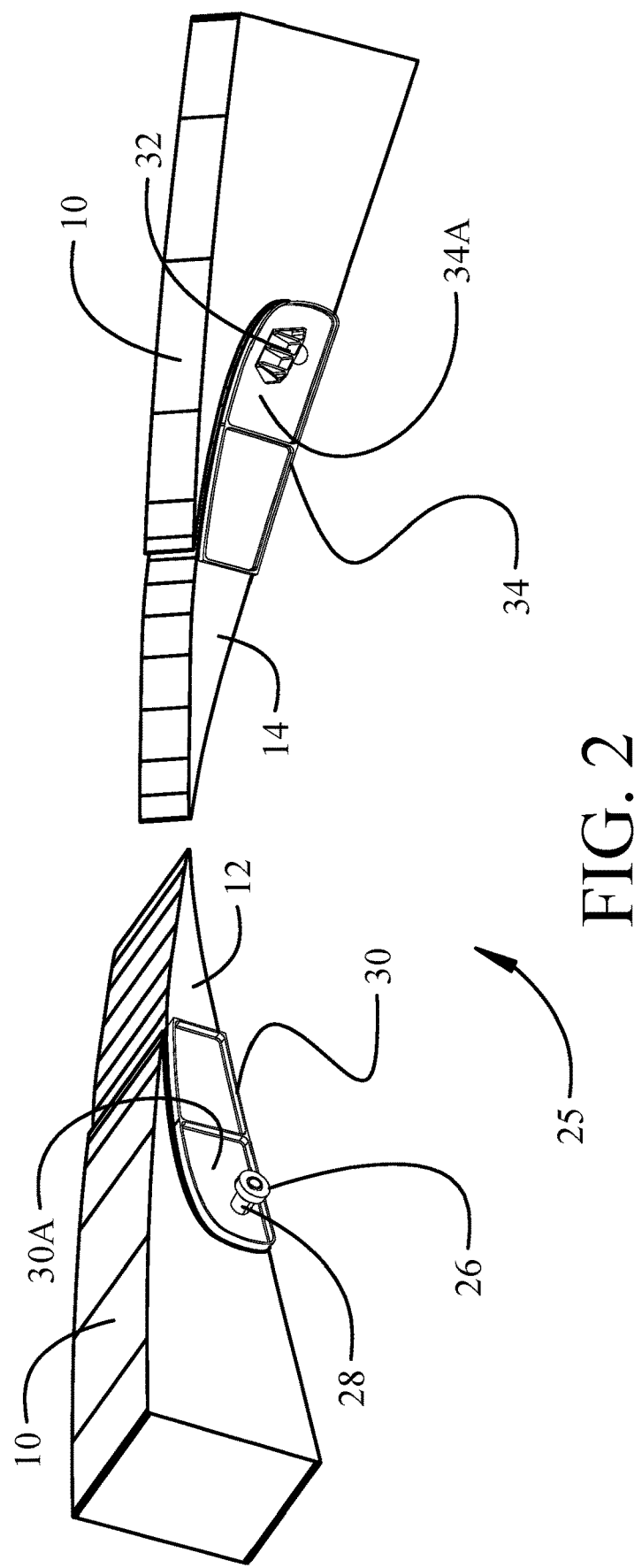
FIG. 2 is a representation of an adjacent inboard flap and outboard flap separated at the outboard and inboard close out ribs, respectively, with each flap rotated to view the interfaces of the adjacent flaps.
Figure 3:
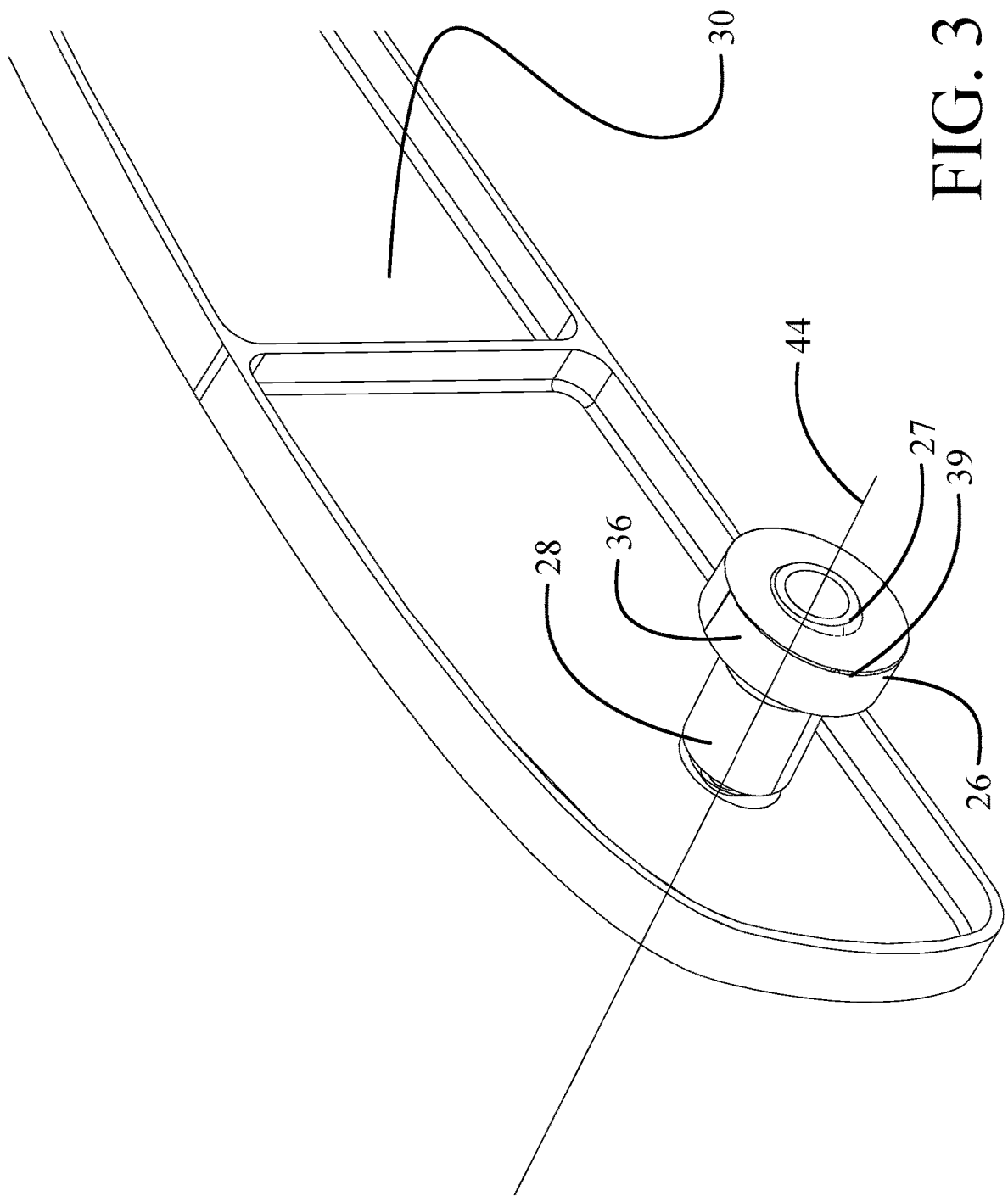
FIG. 3 is a detailed pictorial view of the pin mounted roller extending from the outboard closeout rib of the inboard flap.
Figure 4:
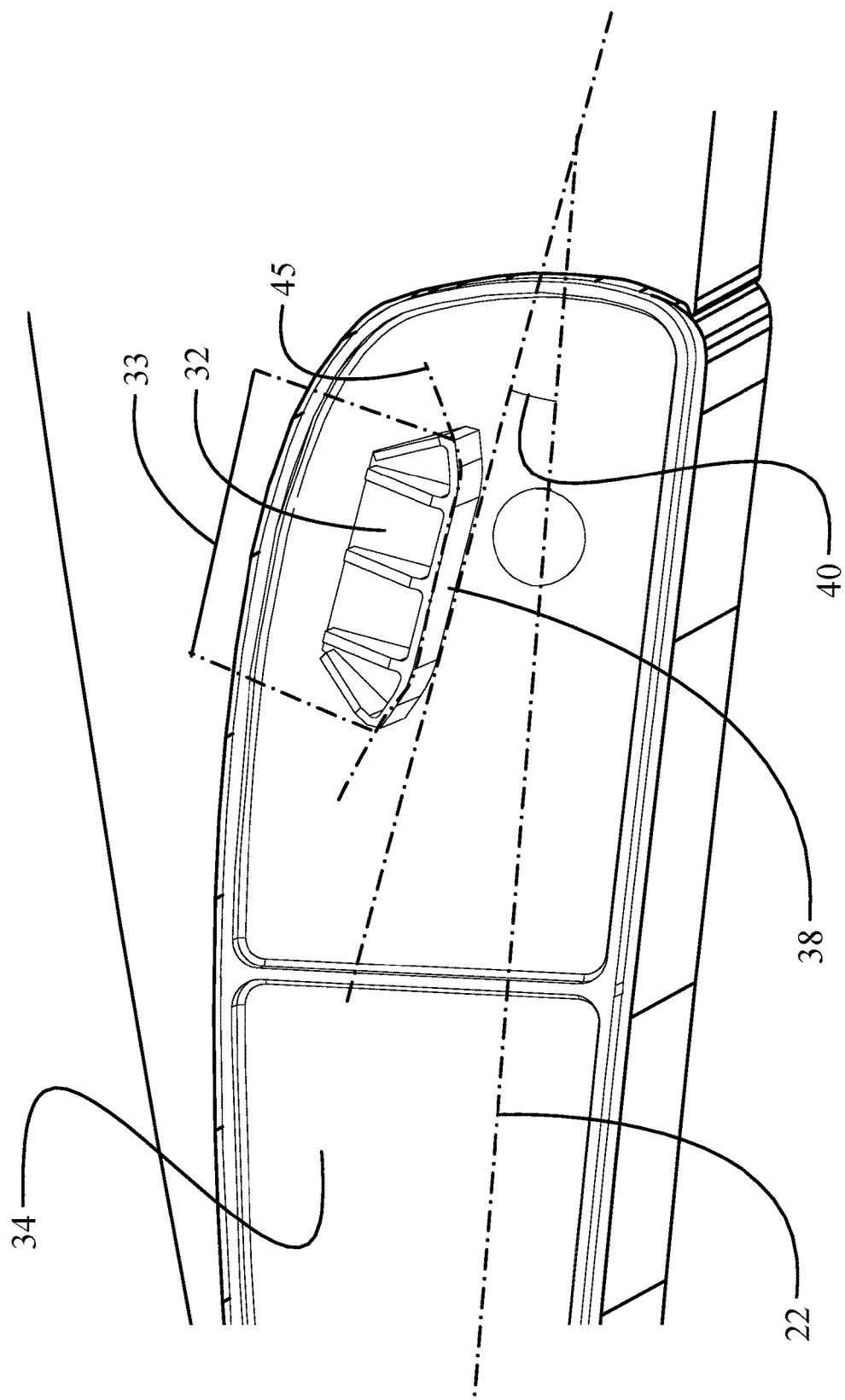
FIG. 4 is a detailed pictorial view of the guide track extending from the inboard closeout rib of the outboard flap.

As seen in FIG. 2, a flap interconnect 25 between the inboard flap 12 and adjacent outboard flap 14 incorporates a roller 26 rotatably mounted on a pin 28 extending from a first interface on one of the outboard or inboard flaps and a guide track 32 extending from a second interface on the other one of the outboard or inboard flaps. The drawing in FIG. 2 is representative of a flap configuration of either a left wing or a right wing. For FIG. 2 using the left wing of FIG. 1 as the example, the pin 28 extends from an outboard side 30A, the outboard closeout rib 30 in the drawings example, of the inboard flap 12. The guide track 32 is mounted to an inboard side 34A, the inboard closeout rib 34 in the drawings example, of the outboard flap 14 to engage the roller 26. As seen in the detailed presentation in FIGS. 3 and 4, the roller 26 has a contact surface 36 that engages the mating surface 38 of the guide track 32 in rolling contact. The guide track engages the roller through mating contact between the roller 26 and the mating surface 38 of the guide track 32, which inhibits deflection of the outboard side of the inboard flap 12 relative to the inboard side of the outboard flap 14 during movement of the inboard flap or outboard flap in the chordwise extension direction. The pin-mounted roller has a contact surface in rolling engagement with a mating surface on the guide track to permit the outboard flap and inboard flap to move independently in the chordwise extension direction, to inhibit binding between the first interface and the second interface upon skewed actuation of the inboard flap and outboard flap. The example contact surface 36 has a filleted outboard edge 39 and, in certain implementations, is curved to accommodate varying angular contact with the mating surface 38. As shown in FIG. 3, the example roller 26 is mounted to the pin 28 with a spherical bearing 27 to allow rotation of the roller 26 relative to a pin axis 29 to maintain flat contact of the contact surface 36 with the mating surface 38 while the roller 26 rotates on the mating surface 38 about roller axis 44. The mating surface 38 has an angle 40 relative to the flap chord 22 determined by the interactive angular motion of the outboard closeout rib 30 and inboard closeout rib 34 due to the differing chordwise extension directions 18, 23 of the inboard flap 12 and outboard flap 14 and the changing deployment angles of the flaps, as will be described in greater detail subsequently. The guide track 32 has a length 33 and a curvature or cam shape of the mating surface (indicated by curve 45) determined in combination with the mating surface 38 angle 40 to maintain contact of the mating surface 38 and roller 26 throughout the range of motion including a potential skew created by unequal deployment of the inboard flap 12 and outboard flap 14.

Figure 5A:
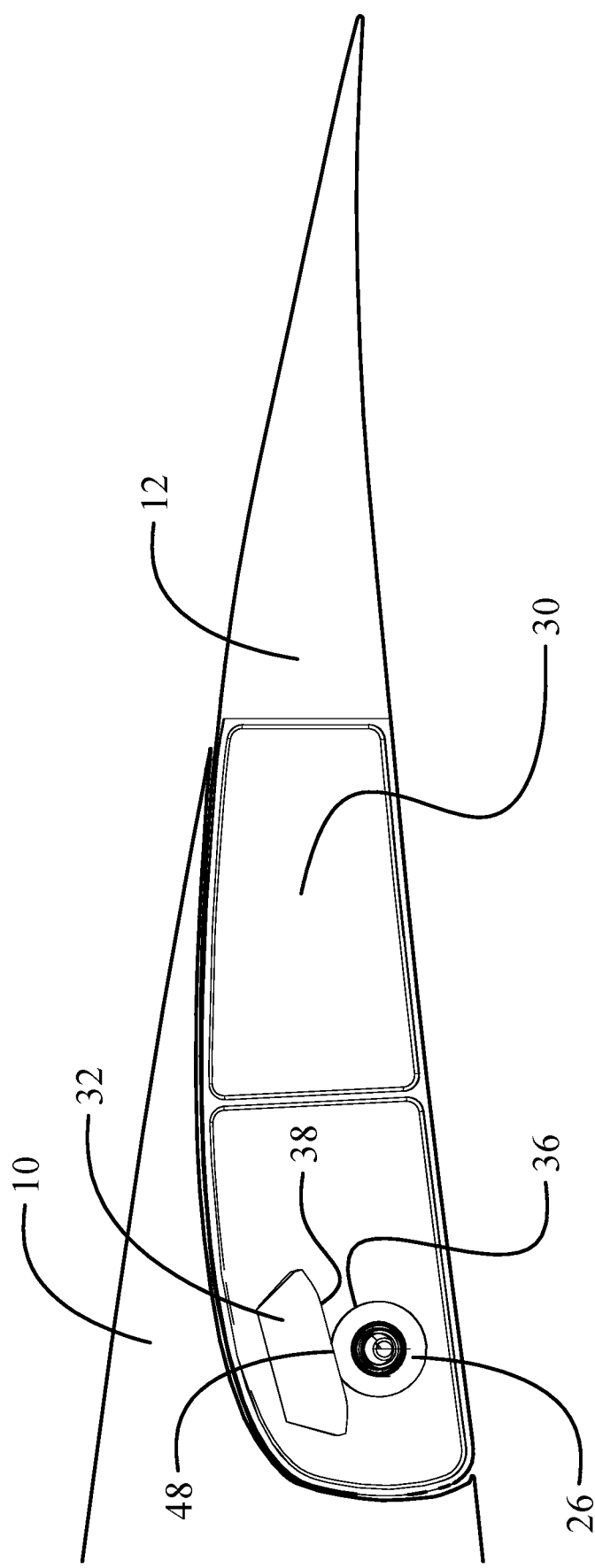
FIG. 5A is a side view representation of the outboard close out rib and pin mounted roller with the guide track shown super imposed with the flaps in a fully retracted position.
Figure 5B:
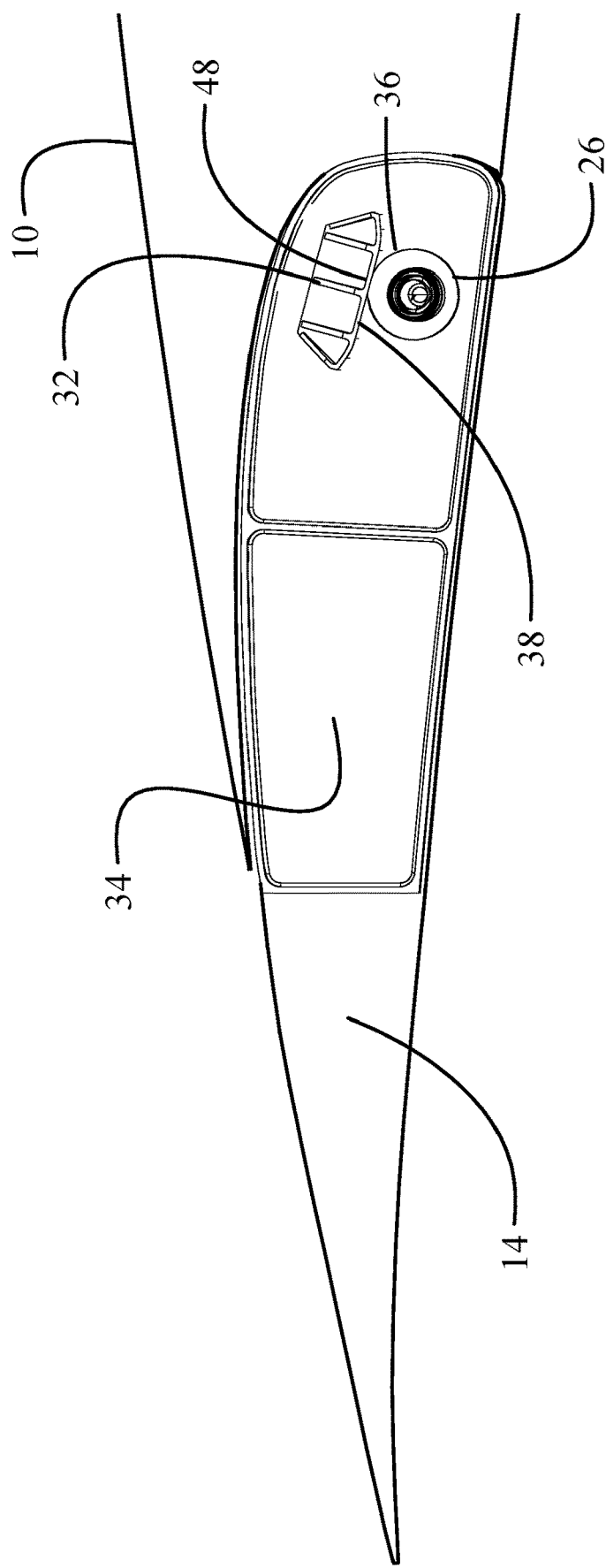
FIG. 5B is a side view representation of the inboard close out rib and guide track with the pin mounted roller shown super imposed in a fully retracted position.
Figure 5C:
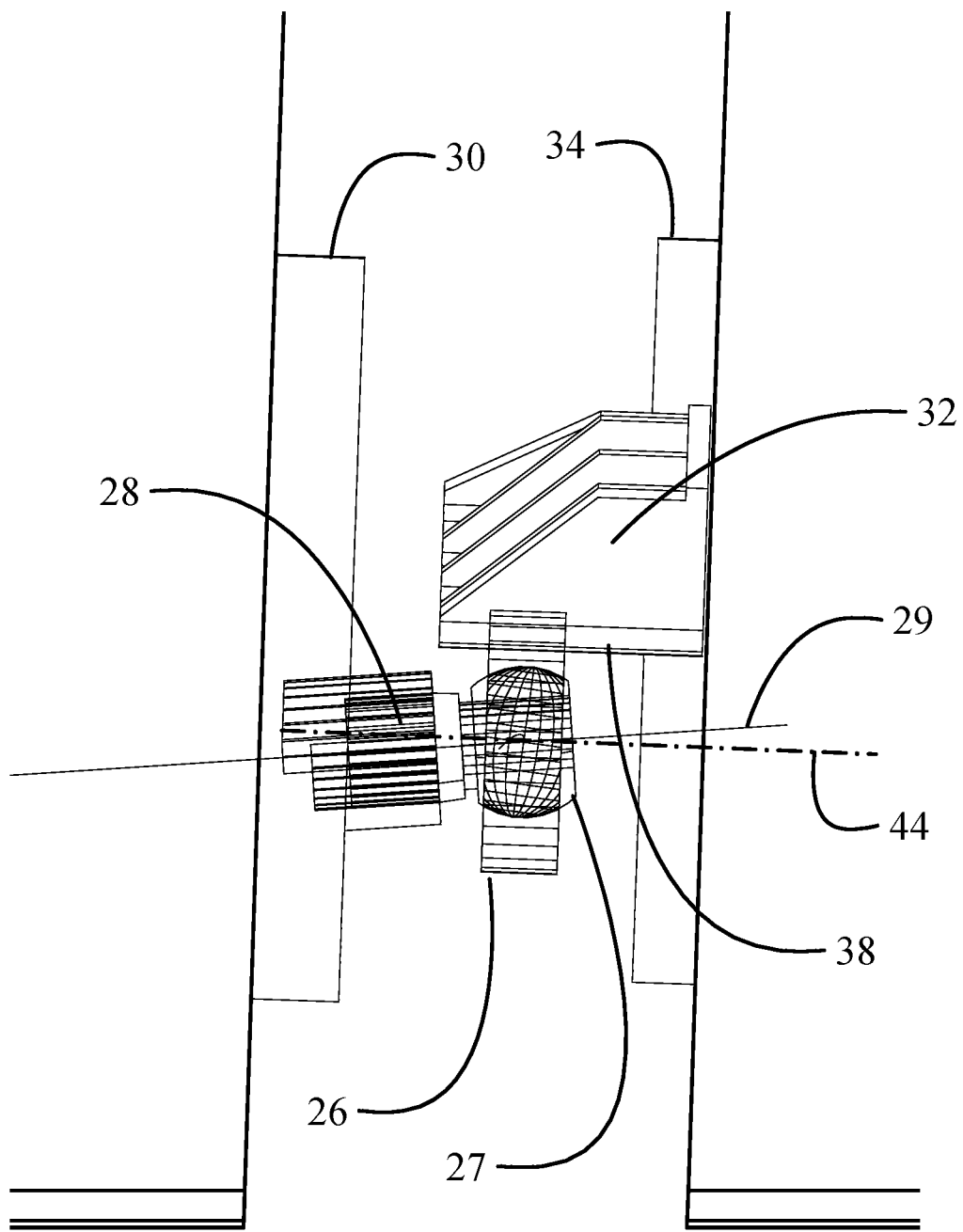
FIG. 5C is a front view representation of the inboard and outboard close out ribs (with wing and flap skins cut away for clarity), with the pin mounted roller engaging the guide track in a fully retracted position.

As seen in FIGS. 5A-5C with the inboard flap 12 and outboard flap 14 in a fully retracted position, the contact surface 36 of the roller 26 engages the mating surface 38 on the guide track 32 to maintain an aligned position of the outboard closeout rib 30 and inboard closeout rib 34. In certain implementations, the guide track 32 may employ a mirroring mating surface with sufficient free tolerance to constrain the roller 26 in both lateral directions with respect to the guide track 32 In the fully retracted position of both flaps, the roller 26 is centrally positioned on the guide track 32 on a center portion 48 of the mating surface 38 such that any skew, fore or aft, of either flap will allow the roller 26 to transition in rolling contact along the guide track 32 fore or aft to accommodate any relative angular variation between outboard closeout rib and inboard closeout rib due to the relative extension direction while maintaining contact between the inboard flap 12 and outboard flap 14. The mating contact between the roller 26 and mating surface 38 inhibits deflection of the outboard side of the inboard flap 12 relative to the inboard side of the outboard flap 14. As seen in FIG. 5C, the outboard closeout rib 30 and inboard closeout rib 34 are parallel in the retracted position with an axis 44 of the roller 26 parallel to the mating surface 38. The spherical bearing 27 is shown in phantom to demonstrate the offset capability for pin axis 29 and roller axis 44.

Figure 6A:
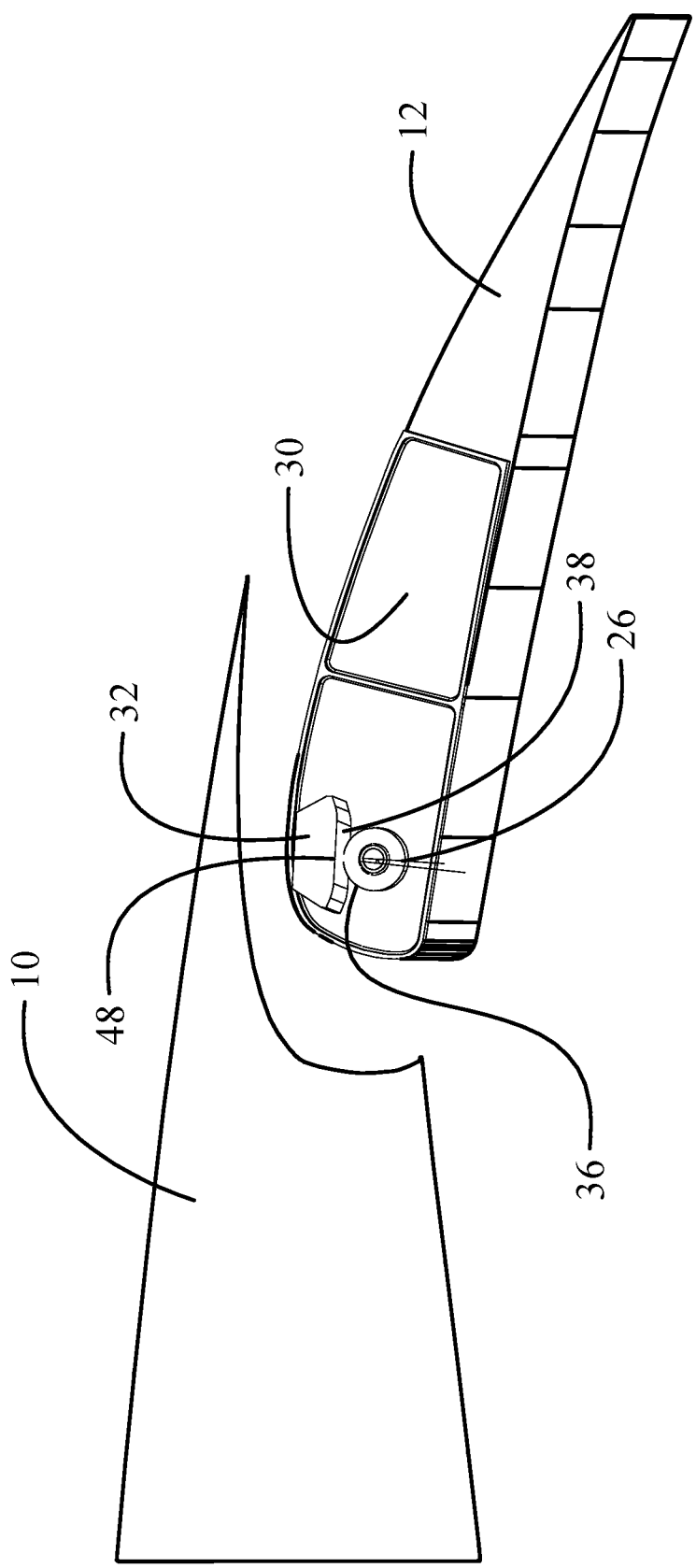
FIG. 6A is a side view representation of the outboard close out rib and pin mounted roller with the guide track shown super imposed with the flaps in a partial deployment position.
Figure 6B:
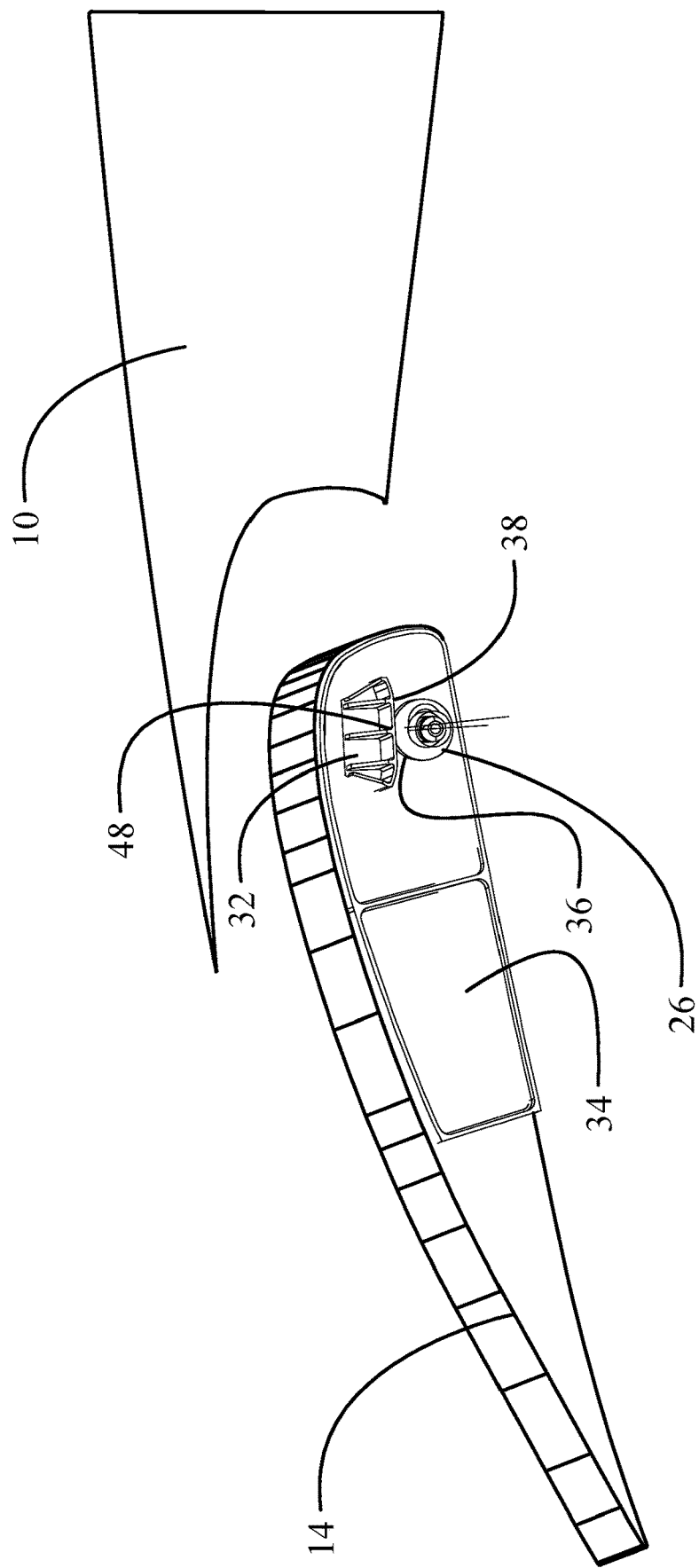
FIG. 6B is a side view representation of the inboard close out rib and guide track with the pin mounted roller shown super imposed in a partial deployment position.
Figure 6C:
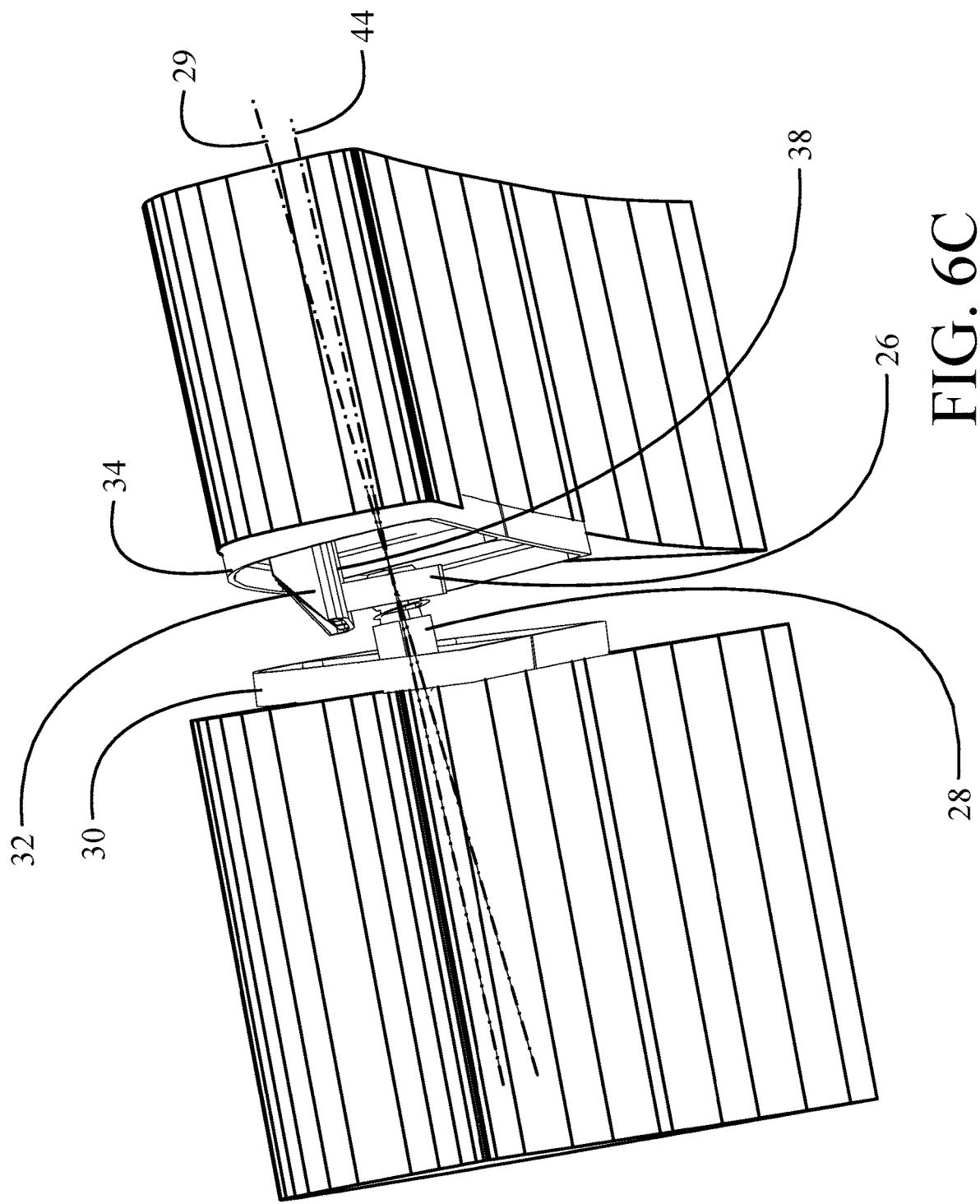
FIG. 6C is a front view representation of the inboard and outboard close out ribs, with the pin mounted roller engaging the guide track in a partial deployment position.

As the flaps are extended as shown in FIGS. 6A-6C, inboard flap 12 travels along extension direction 18 and outboard flap 14 travels along extension direction 23 (as seen in FIG. 1). With even extension of both flaps, the roller 26 remains positioned on a center portion 48 of the mating surface 38 the guide track 32. However, rolling contact of the contact surface 36 with guide track 32 allows the flap interconnect 25 to mitigate any potential binding due to relative movement for any skewing, fore or aft, of either flap whether induced by intended actuation or failure. This accommodates any relative angular variation between outboard closeout rib 30 and inboard closeout rib 34 during extension due to the relative extension direction while maintaining contact between the inboard flap 12 and outboard flap 14 as well as other skewed conditions to be discussed subsequently. As seen in FIG. 6C, for the example implementation shown in the drawings, the angular difference in extension direction 18 of the inboard flap 12 and extension direction 23 of the outboard flap 14 induces an angular change between the outboard closeout rib 30 and the inboard closeout rib 34 that alters the angle of pin axis 29 with respect to the inboard closeout rib. Mounting of the roller 26 to the pin 28 with spherical bearing 27 allows the axis 44 of the roller 26 to remain parallel to the mating surface 38 of the guide track 32 to maximize contact of the contact surface 36.

Figure 7A:
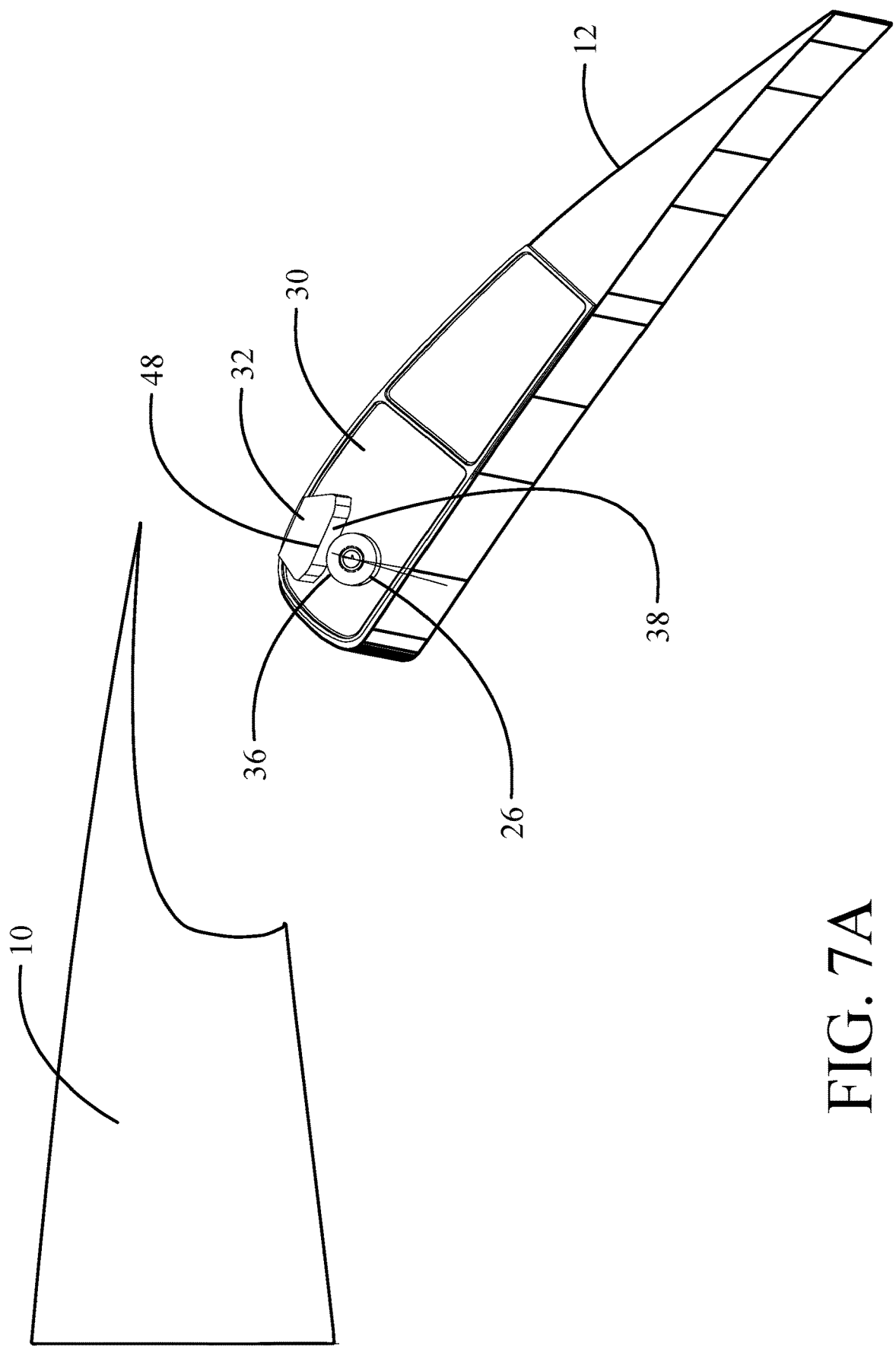
FIG. 7A is a side view representation of the outboard close out rib and pin mounted roller with the guide track shown super imposed with the flaps in a full deployment position.
Figure 7B:
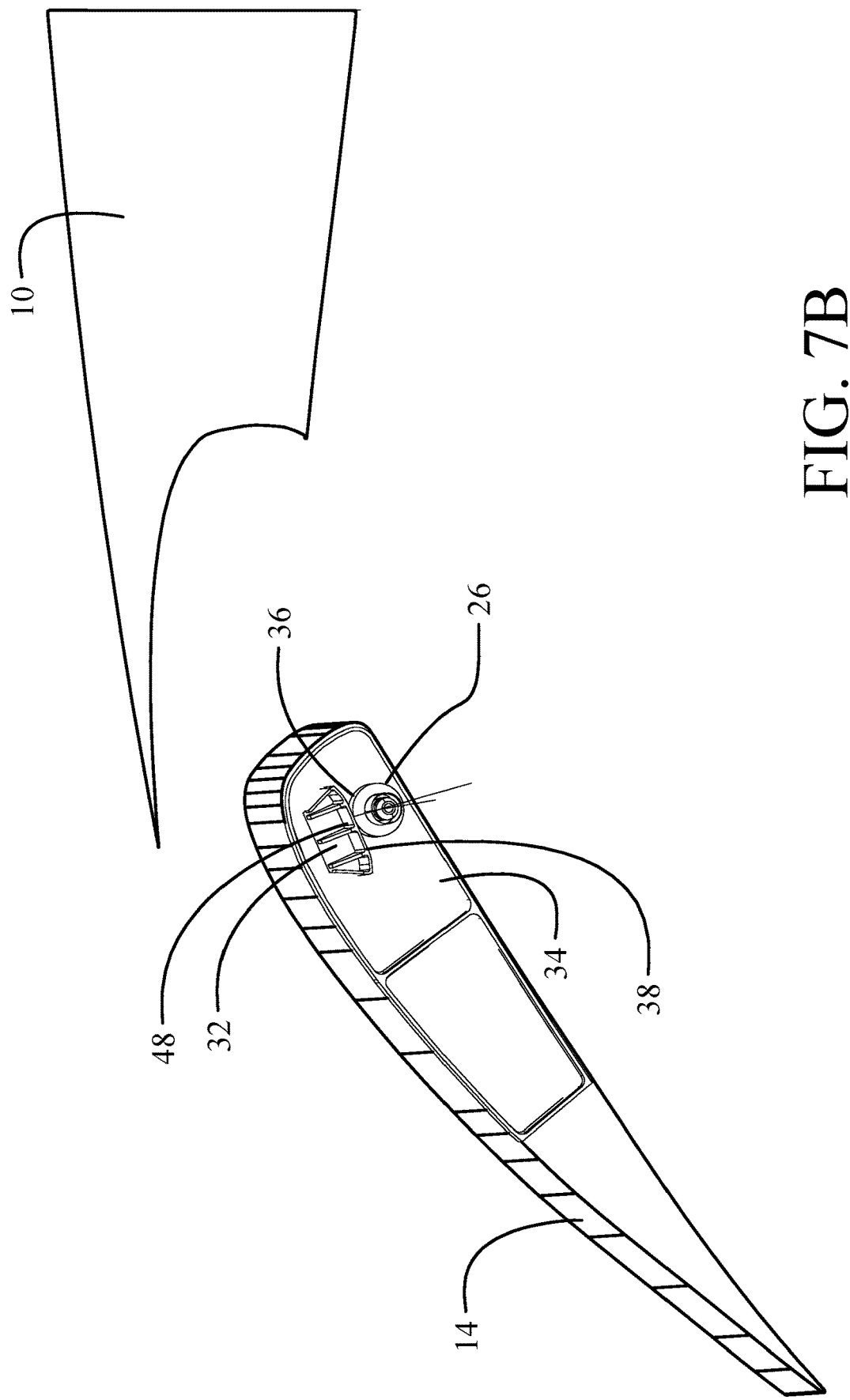
FIG. 7B is a side view representation of the inboard close out rib and guide track with the pin mounted roller shown super imposed in a full deployment position.
Figure 7C:
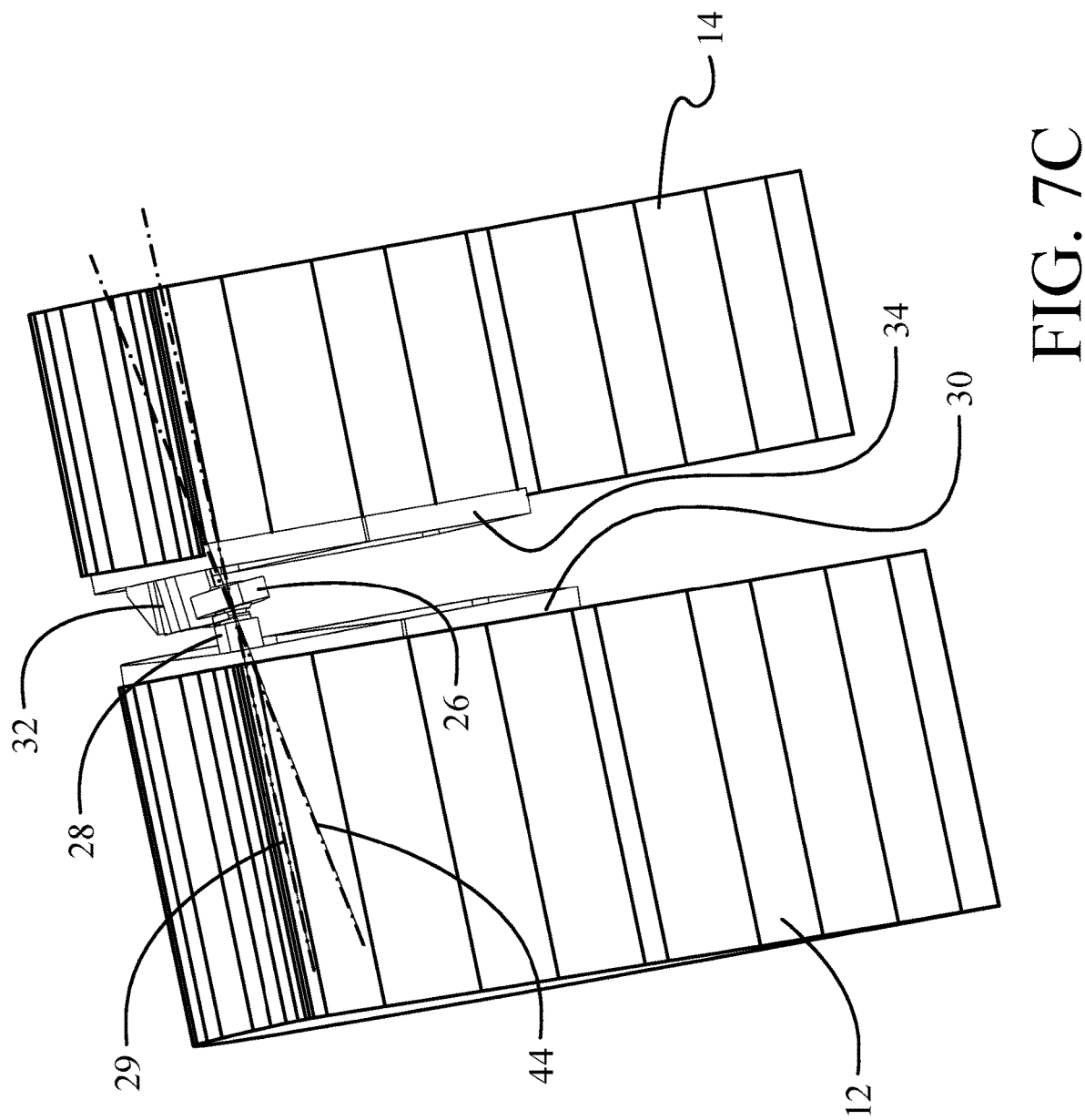
FIG. 7C is a front view representation of the inboard and outboard close out ribs, with the pin mounted roller engaging the guide track in a partial full position.

When the flaps are fully extended as shown in FIGS. 7A-7C, with even extension of both flaps, the roller 26 remains positioned on the center portion 48 of the mating surface 38 the guide track 32. FIG. 7C demonstrates the increased angular difference between the outboard closeout rib 30 and the inboard closeout rib 34 that further alters the angle of pin axis 29 with respect to the inboard closeout rib. Roller 26 further rotating on spherical bearing 27 with respect to pin axis 29 allows the axis 44 of the roller 26 to remain parallel to the mating surface 38 of the guide track 32 to maximize contact.

Figure 8A:
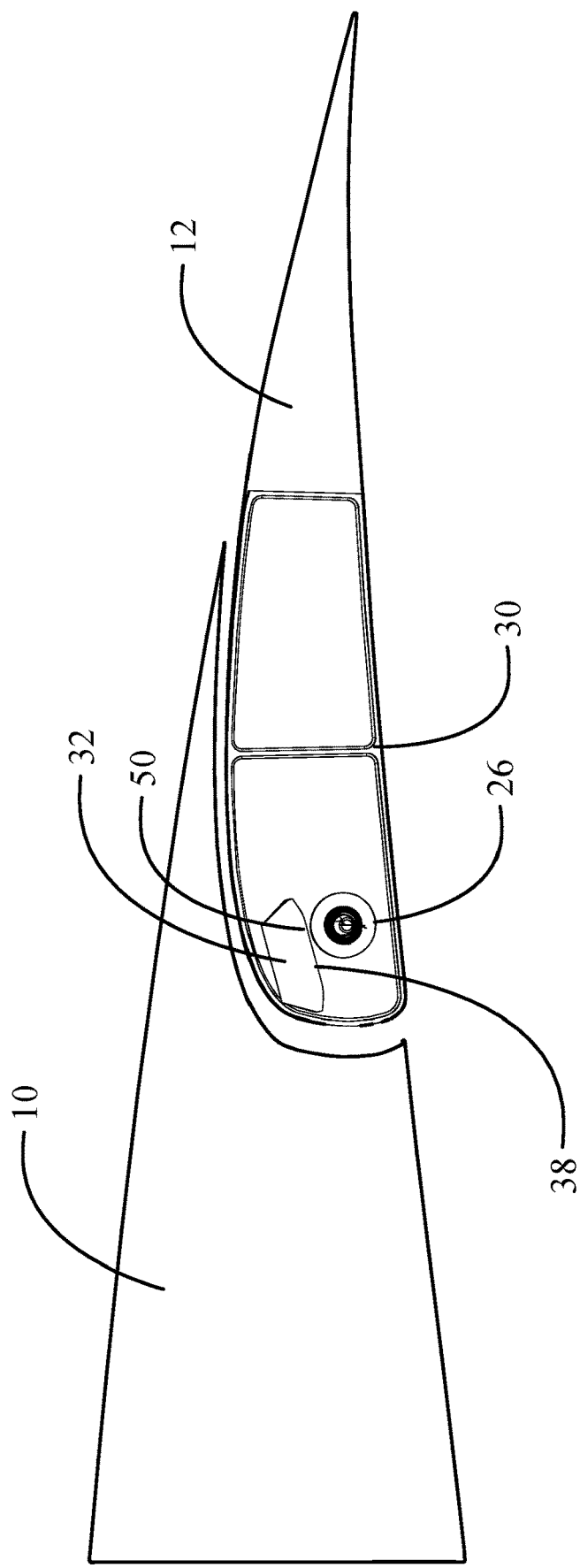
FIG. 8A is a side view representation of the outboard close out rib and pin mounted roller with the guide track shown super imposed with the inboard flap in a TEVC position.
Figure 8B:
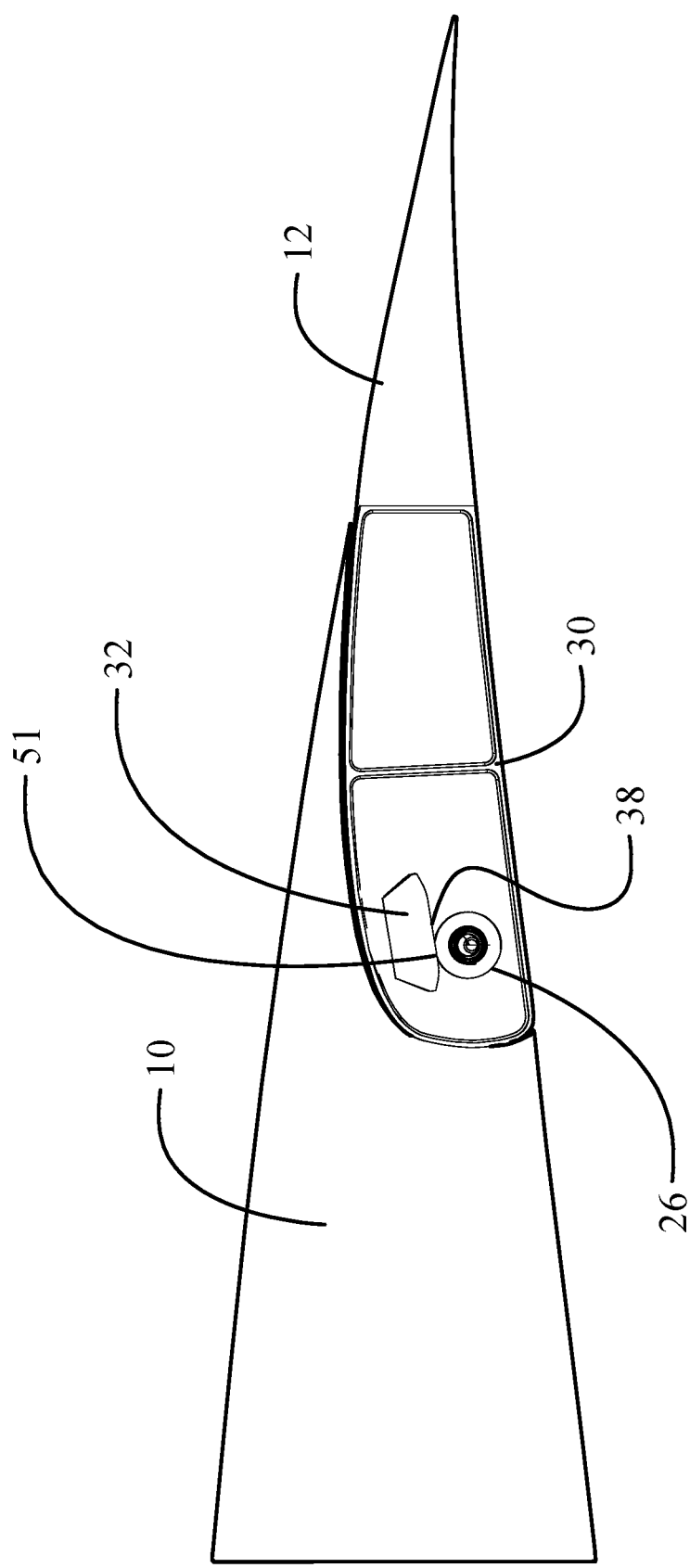
FIG. 8B is a side view representation of the outboard close out rib and pin mounted roller with the guide track shown super imposed with the outboard flap in a TEVC position.

Current flap systems may operate with various trailing edge variable camber (TEVC) settings. TEVC aids the high speed (cruise) performance of the airplane. There may be aggressive takeoff/landing conditions where the inboard flap is deployed further than the outboard flap to reduce the wake vortex of the airplane providing an economic benefit that the next airplane can takeoff/land behind it sooner. TEVC may also include one (or more) flaps being further retracted into the cove of the wing. "TEVC up" of one flap, while the other remains at neutral or slightly down. TEVC may be applied to one or both of the inboard flap 12 or outboard flap 14. As shown in FIG. 8A, adjustment of the inboard flap 12 downward to a TEVC position creates an intentional differentiation or skewed actuation in extension of the inboard flap 12 from the outboard flap 14. This TEVC positioning causes the roller 26 to roll aft into an aft portion 50 of the mating surface 38 of guide track 32 with motion of the pin 28 and roller 26 with the inboard flap 12 while the outboard flap 14 remains stowed in the fully retracted position. Similarly, as seen in FIG. 8B, the outboard flap may alternatively be positioned downward to a TEVC position also creating an intentional differentiation in extension of the inboard flap 12 from the outboard flap 14. This TEVC positioning causes the roller 26 to roll forward onto a forward portion 51 along the mating surface 38 of guide track 32 caused by motion of the guide track with the outboard flap while the inboard flap remains stowed in the fully retracted position.

Figure 9A:
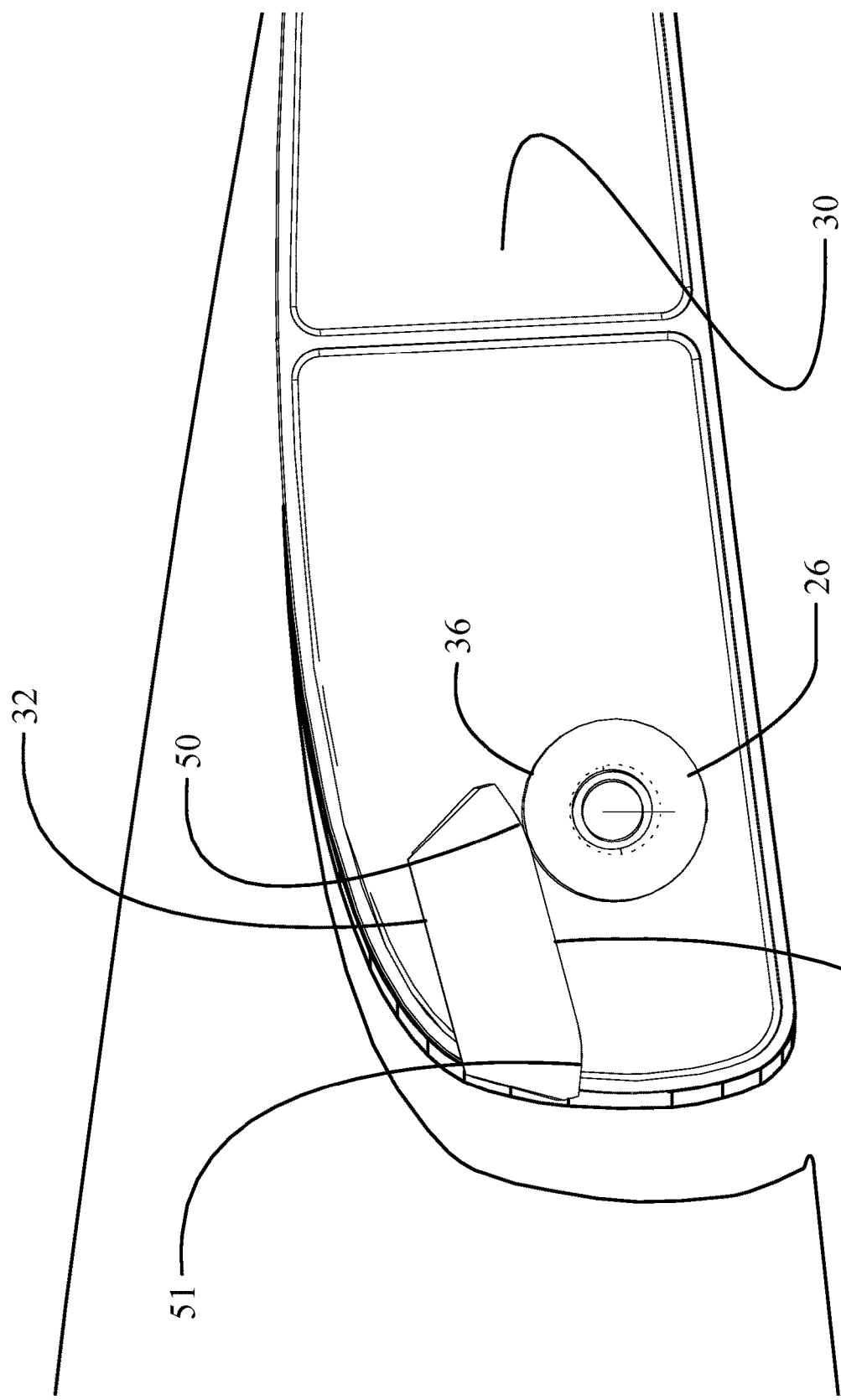
FIG. 9A is a side view representation of the outboard close out rib and pin mounted roller with the guide track shown super imposed with the flaps with the inboard flap skewed aft with respect to the outboard flap.
Figure 9B:
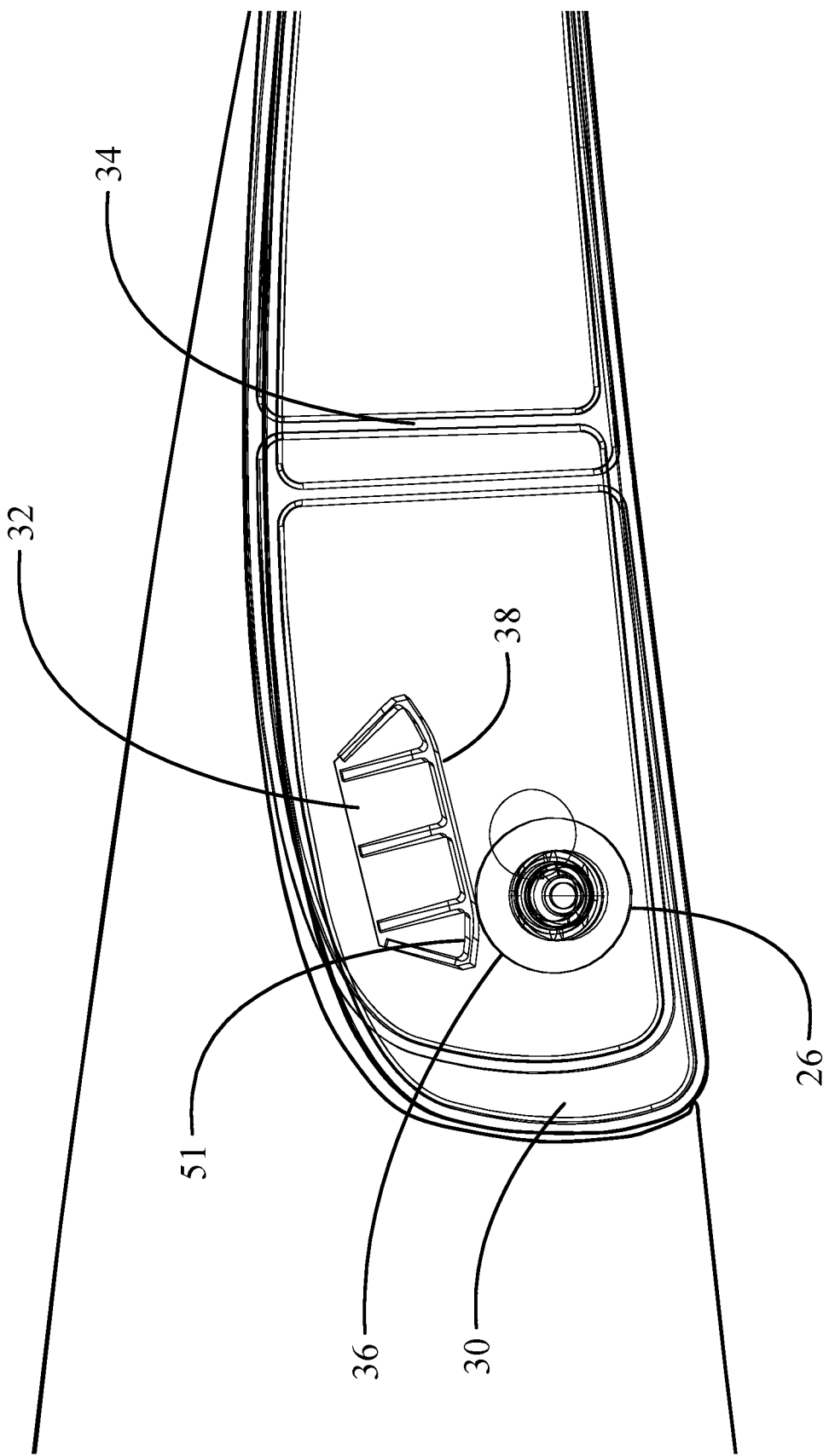
FIG. 9B is a side view representation of the outboard close out rib and pin mounted roller with the guide track shown super imposed with the flaps with the outboard flap skewed aft with respect to the inboard flap.
Figure 9C:
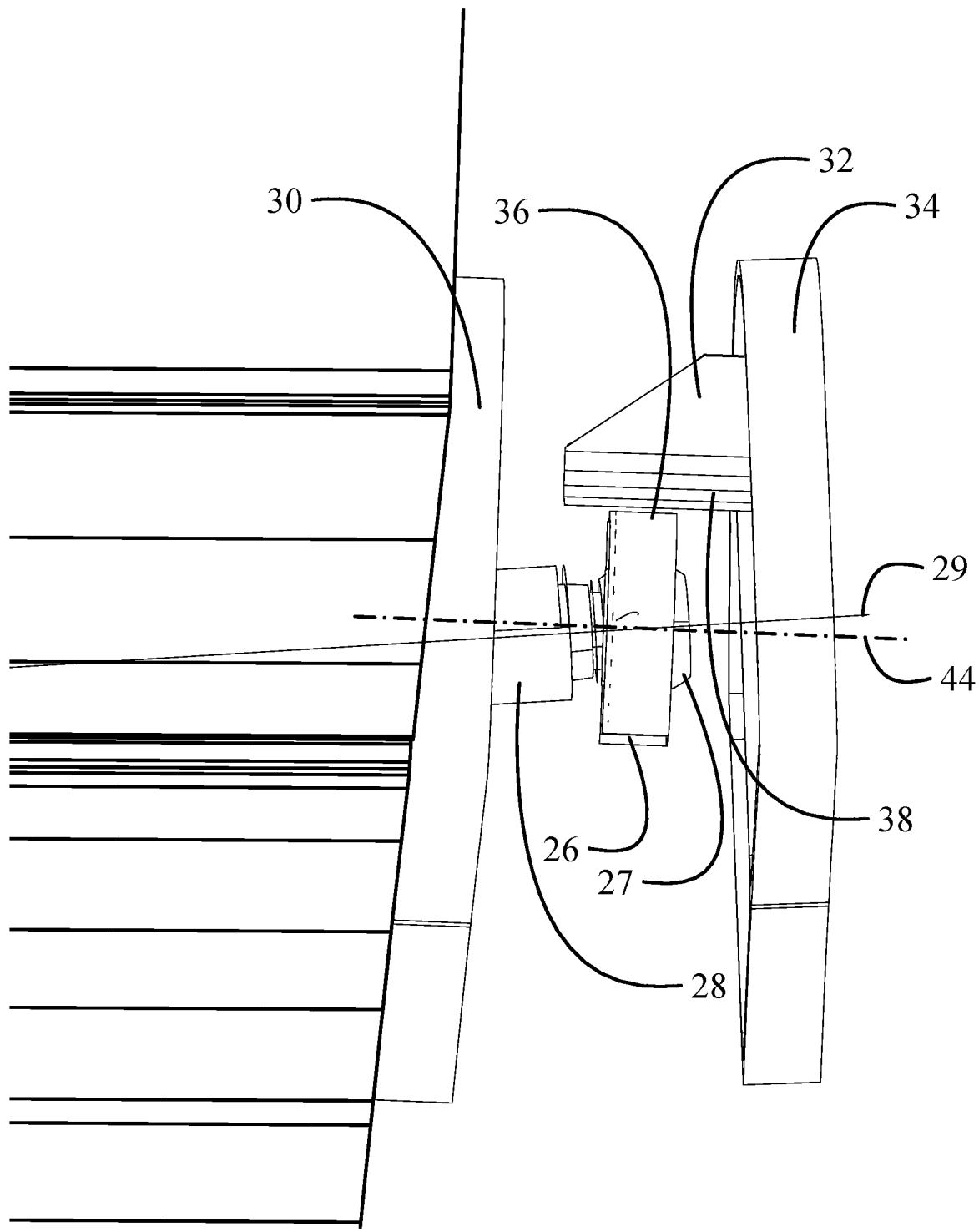
FIG. 9C is a front view representation of the inboard and outboard close out ribs, with the pin mounted roller engaging the guide track in retracted position but with and the inboard flap skewed aft with respect to the outboard flap.
Figure 9D:
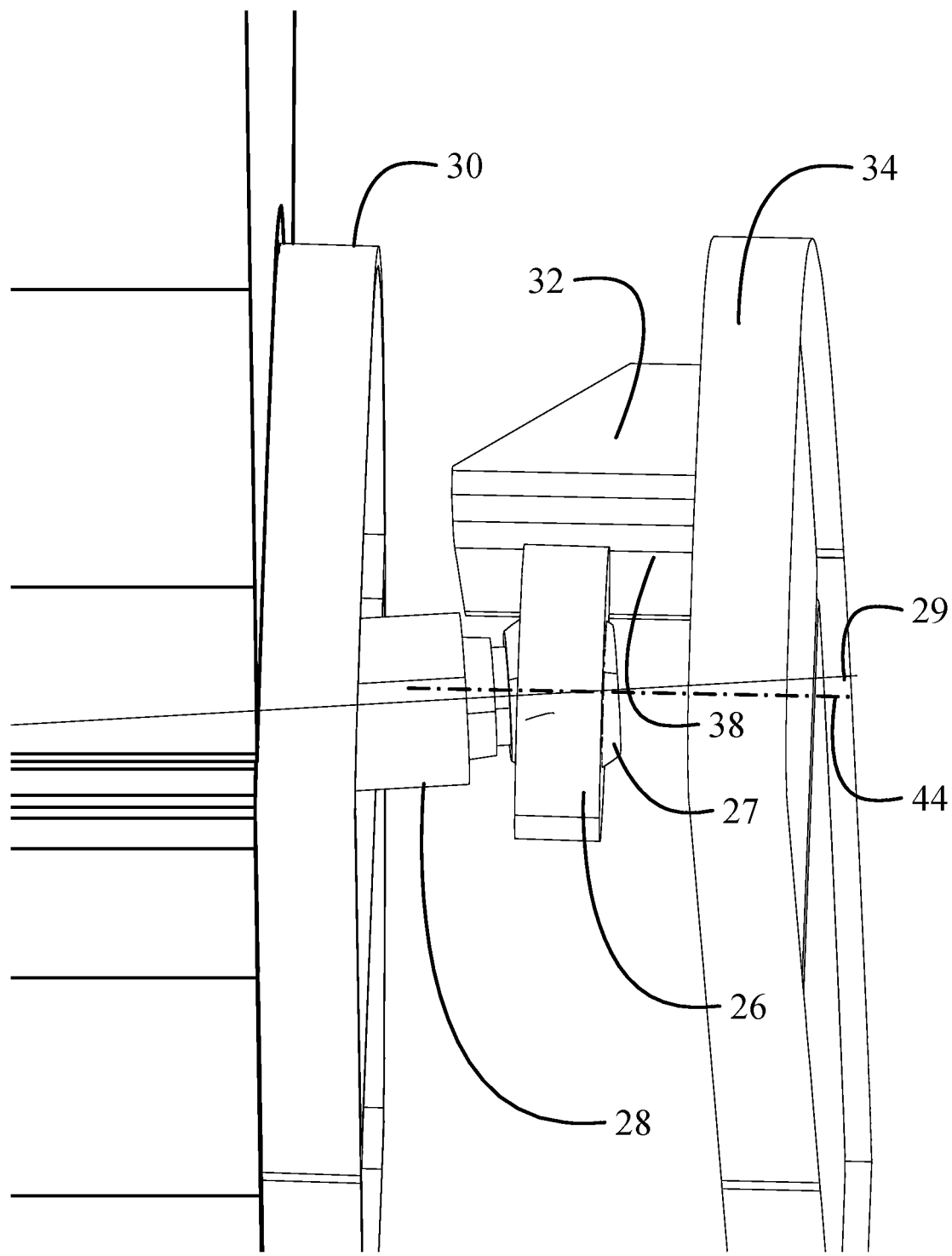
FIG. 9D is a front view representation of the inboard and outboard close out ribs, with the pin mounted roller engaging the guide track in retracted position but with the outboard flap skewed aft with respect to the inboard flap; and, FIG. 10 is a flow chart of a method for flap interconnection using the exemplary implementation.

Skewing of either the inboard flap 12 or outboard flap 14 due to aerodynamic conditions or support track or actuator failure conditions is accommodated in the flap interconnect 25 by relative rolling movement of the roller 26 and guide track 32 thereby avoiding imposing deforming structural loads on either flap. As seen in FIGS. 9A through 9D, relative skewing of the flaps at any retracted or deployed position causes the roller 26 to roll on the mating surface 38 of the guide track 32. As examples, skewing of the inboard flap 12 aft relative to the outboard flap 14 as seen in FIGS. 9A and 9C, causes the roller 26 to roll forward on the mating surface 38. Skewing of the outboard flap 14 aft relative to the inboard flap 12 as seen in FIGS. 9B and 9D, causes the roller 26 to roll aft on the mating surface 38. As seen in FIGS. 9C and 9D relative rotation of the inboard and outboard flap (skew) is accommodated since the roller 26 is not fixed and may "scrub" on the mating surface 28 as well as roll to adapt to the mismatch.

Figure 10:
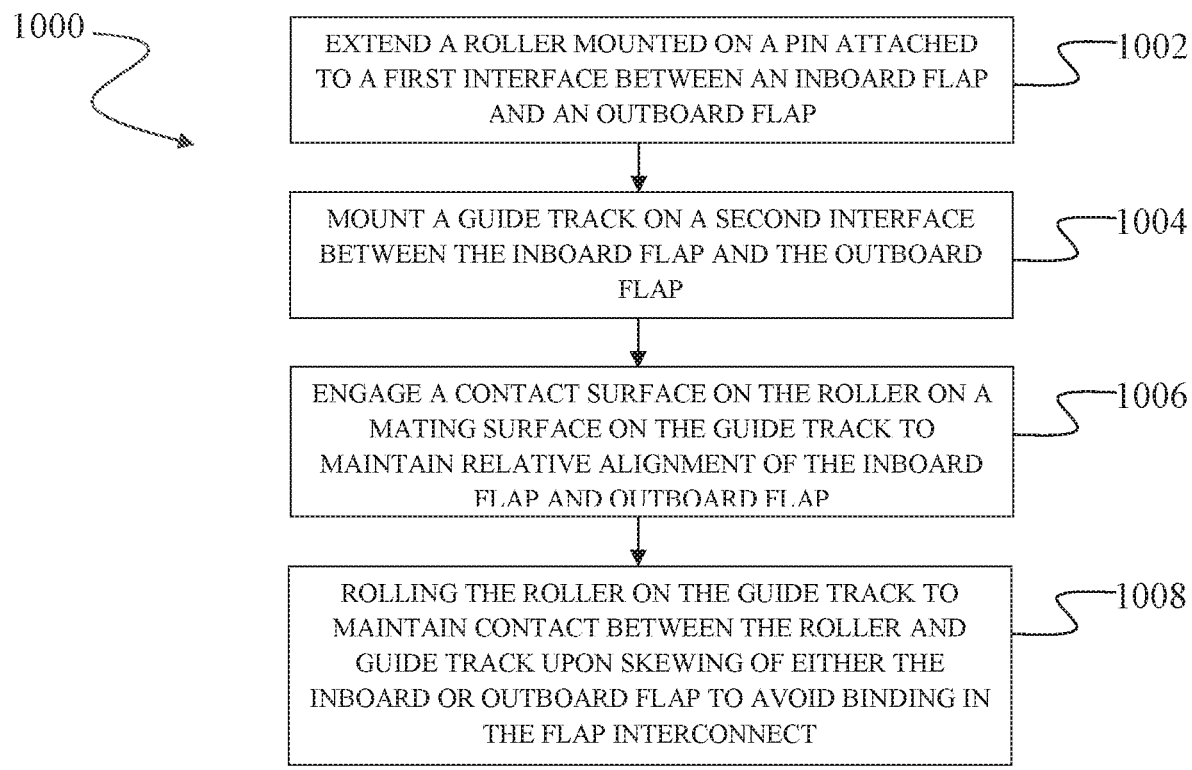

The implementations disclosed herein provide a method 1000 for engagement between an inboard flap 12 and an outboard flap 14 as shown in FIG. 10. A flap interconnect 25 extends a roller 26 mounted on a pin attached to a first interface between an inboard flap 12 and outboard flap 14, step 1002. The flap interconnect mounts a guide track 32 on a second interface between inboard flap 12 and outboard flap 14, step 1004. In one implementation the first interface is the outboard closeout rib 30 on the inboard flap 12 and the second interface is the inboard closeout rib 34 on the outboard flap 14. In a second implementation the first interface is the inboard closeout rib 34 of the outboard flap 14 while the second interface is the outboard closeout rib 30 of the inboard flap 12. A contact surface 36 on the roller 26 engages a mating surface 38 on the guide track 32, step 1006, to maintain relative alignment of the inboard flap 12 and outboard flap 14. Upon skewing of either the inboard flap 12 or the outboard flap 14, rolling motion of the roller 26 on the guide track 32 maintains contact between the roller and guide track while avoiding binding in the flap interconnect 25, step 1008.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. An aircraft wing having a flap arrangement comprising:
    an inboard flap configured to move in a chordwise extension direction relative to the wing, the inboard flap having an outboard side;
    an outboard flap adjacent to the inboard flap and configured to move in the chordwise extension direction relative to the wing, the outboard flap including an inboard side;
    a flap interconnect between the inboard flap and outboard flap having,
        a roller mounted to a pin extending from the outboard side of the inboard flap;
        a guide track extending from the inboard side of the outboard flap, wherein the guide track engages the roller on the inboard flap to limit deflection of the outboard flap relative to the inboard flap during movement of the inboard flap in the chordwise extension direction and movement of the outboard flap in the chordwise extension direction, to provide relative alignment of the inboard flap and outboard flap.

2. The aircraft wing having a flap arrangement as defined in claim 1 wherein a contact surface of the roller is in rolling contact on a mating surface of the guide track permitting the inboard flap and outboard flap to move independently in the chordwise extension direction whereby binding in the flap interconnect is mitigated upon skewing of either the inboard flap or outboard flap.

3. The aircraft wing having a flap arrangement as defined in claim 1 wherein the roller has a contact surface and the guide track has a mating surface engaged by the contact surface, said mating surface having a cam shape.

4. The aircraft wing having a flap arrangement as defined in claim 3 wherein the roller is mounted to the pin with a spherical bearing for rotation of the roller about an axis of the pin whereby an axis of the roller is maintained parallel to the mating surface.

5. The aircraft wing having a flap arrangement as defined in claim 3 wherein the mating surface has an angle relative to a flap chord.

6. The aircraft wing having a flap arrangement as defined in claim 3 wherein the mating surface has a center portion contacted by the roller in even extension of the inboard flap and outboard flap.

7. The aircraft wing having a flap arrangement as defined in claim 6 wherein the mating surface has an aft portion whereby adjustment of the inboard flap downward to a trailing edge variable camber (TEVC) position creates an intentional differentiation in extension of the inboard flap from the outboard flap causing the roller to roll aft into the aft portion of the mating surface with motion of the pin and roller with the inboard flap while the outboard flap remains stowed in a fully retracted position.

8. The aircraft wing having a flap arrangement as defined in claim 6 wherein the mating surface has an forward portion whereby adjustment of the outboard flap downward to a TEVC position creates an intentional differentiation in extension of the outboard flap from the inboard flap causing the roller to roll forward into the forward portion of the mating surface with motion of the guide track with the outboard flap while the inboard flap remains stowed in a fully retracted position.

9. A flap interconnect between an inboard flap and an outboard flap, comprising:
   a roller mounted to a pin extending from one of an outboard closeout rib or an inboard closeout rib;
   a guide track extending from the other one of the outboard closeout rib or the inboard closeout rib, wherein the guide track engages the roller to limit deflection of the outboard flap relative to the inboard flap during movement of the inboard flap in a chordwise extension direction and movement of the outboard flap in the chordwise extension direction, to provide relative alignment of the inboard flap and outboard flap.

10. The flap interconnect between an inboard flap and an outboard flap as defined in claim 9 wherein the roller has a contact surface and the guide track has a mating surface engaged by the contact surface, said mating surface having a cam shape.

11. The flap interconnect between an inboard flap and an outboard flap as defined in claim 10 wherein the roller is mounted to the pin with a spherical bearing for rotation of the roller about an axis of the pin whereby an axis of the roller is maintained parallel to the mating surface.

12. The flap interconnect between an inboard flap and an outboard flap as defined in claim 10 wherein the mating surface has an angle relative to a flap chord.

13. A flap configuration for a wing comprising:
   an inboard flap couplable to a wing and configured to move in a chordwise extension direction relative to the wing;
   an outboard flap couplable to the wing adjacent to the inboard flap and configured to move in the chordwise extension direction relative to the wing;
   a pin-mounted roller extending from a first interface on a first one of the inboard flap or the outboard flap, and
   a guide track extending from a second interface adjacent to the first interface, said second interface on a second one of the inboard flap or the outboard flap, wherein the guide track is positioned to engage the pin-mounted roller to limit deflection of the outboard flap relative to the inboard flap during movement to provide relative alignment of the inboard and outboard flaps.

14. The flap configuration for a wing as defined in claim 13 wherein the pin-mounted roller has a contact surface in rolling engagement with a mating surface on the guide track to permit the outboard flap and inboard flap to move independently in the chordwise extension direction, to inhibit binding between the first interface and the second interface upon skewed actuation of the inboard flap and outboard flap.

15. The flap configuration for a wing as defined in claim 13 wherein the first interface comprises an outboard side of the inboard flap, and the second interface comprises an inboard side of the outboard flap.

16. The flap configuration for a wing as defined in claim 13 wherein the second interface comprises an outboard side of the inboard flap, and the first interface comprises an inboard side of the outboard flap.

17. A method for engagement between an inboard flap and an outboard flap, said method comprising:
   extending a roller mounted on a pin attached to a first interface between and inboard flap and outboard flap in a flap interconnect;
   mounting a guide track on a second interface between inboard flap and outboard flap in the flap interconnect;
   engaging a contact surface on the roller with a mating surface on the guide track to maintain relative alignment of the inboard flap and outboard flap.

18. The method as defined in claim 17 further comprising:
   upon skewing of either the inboard flap or the outboard flap, maintaining contact between the roller and the guide track by rolling motion of the roller on the guide track while avoiding binding in the flap interconnect.

19. The method as defined in claim 17 wherein the first interface is an outboard closeout rib on the inboard flap and the second interface is an inboard closeout rib on the outboard flap.

20. The method as defined in claim 17 wherein the first interface is an inboard closeout rib of the outboard flap while the second interface is an outboard closeout rib of the inboard flap.

* * * * *